Oct. 23, 1962   W. QUELLMALZ   3,059,959
CONTROL ELEMENT FOR RAISING AND LOWERING
A WINDOW OF A MOTOR VEHICLE
Filed June 8, 1959   2 Sheets-Sheet 1

INVENTOR.
WOLFRAM QUELLMALZ
BY
Dicke, Craig and Freudenberg
ATTORNEYS

Oct. 23, 1962 W. QUELLMALZ 3,059,959
CONTROL ELEMENT FOR RAISING AND LOWERING
A WINDOW OF A MOTOR VEHICLE
Filed June 8, 1959 2 Sheets-Sheet 2

INVENTOR.
WOLFRAM QUELLMALZ
BY
Dicke, Craig & Freudenberg
ATTORNEYS.

3,059,959
CONTROL ELEMENT FOR RAISING AND LOWERING A WINDOW OF A MOTOR VEHICLE

Wolfram Quellmalz, Sindelfingen, Kreis Boblingen, Germany, assignor to Daimler-Benz Aktiengesellschaft, Stuttgart-Unterturkheim, Germany
Filed June 8, 1959, Ser. No. 818,843
Claims priority, application Germany June 7, 1958
3 Claims. (Cl. 296—44)

The present invention relates to a control handle or the like for opening and closing a window, particularly of a motor vehicle.

In most motor vehicles, the windows in the doors thereof are slidable in the vertical direction so that, when they are opened, they are partly or entirely sunk into the doors. For this purpose, the window pane is slidably supported in suitable guides and the lower part thereof is secured to a slide member which is operatively connected to a crank drive so that, when the crank is turned to open the window, the slide member is lowered and thereby takes along the window. This manner of manipulating the window of a motor vehicle is accompanied by a series of disadvantages. It is usually rather difficult to operate the crank drive, especially if the car is fully occupied, and the crank drive easily collects dirt which increases the friction thereof and renders it still more difficult to open and close the window. Furthermore, since the crank gear is of the self-locking type, it usually requires a relatively large number of crank revolutions until the window has been lowered from its fully closed position to its lowest position.

In order to overcome these disadvantages, it has been proposed in the copending application of Erwin Hitzelberger, Serial No. 691,462, filed on October 21, 1957, now Patent No. 3,014,716 (common assignee), to raise and lower the window by means of a cable drive. The window may then be moved from the highest to the lowest position by a single movement of a handle, for example, in a horizontal direction. This mechanism consists of an endless cable at the inside of the car door. This cable passes, for example, over three pulleys so as to extend first in a horizontal direction, then in a vertical direction, and finally in an oblique direction. If the control handle is movable horizontally, it may be connected to the horizontal part of the cable, while the vertical part carries a slide member which is connected to the window, and the oblique part is connected to a long coil spring, rubber band or the like for compensating the weight of the window at any position thereof so that only the friction of the mechanism has to be overcome when the same is operated to raise or lower the window.

It is an object of the present invention to provide a control handle which is especially adapted for operating a mechanism of the type as above described, and which is especially suitable for use in a motor vehicle by complying with the requirements of being easily mounted on the inner wall of a vehicle door, of being easily operated and reliable in its function, and of being designed so as to adapt itself to the contours of the vehicle door and not to project toward the inside of the car except when being manipulated to open or close the window.

It is an essential feature of the control handle according to the invention for a window raising and lowering mechanism of the type as above described that it is made in the form of a lever which is pivotably mounted on a suitable bracket which, in turn, is slidable within a pair of rails or the like, preferably in a straight direction, and is positively connected to one part of the endless cable, while another part of the cable is connected to the slide member which supports the window.

While this control handle normally rests substantially within the plane of the inner door covering, it is preferably pivotable so as to extend at an angle of approximately 90° to such plane when it is in the operative position. Such pivotal movement of the handle preferably proceeds within a vertical plane, while the bracket on which it is mounted is preferably movable in a horizontal direction and therefore connected to the horizontal part of the endless cable.

Further objects, features, and advantages of the present invention will become apparent from the following detailed description thereof, particularly when read with reference to the accompanying drawings, in which—

The window control handle according to the invention is primarily intended for use in connection with a window raising and lowering mechanism of the type as broadly described above and as described in detail, for example, in the copending application Serial No. 691,462. The following description and the drawings are therefore limited to the present invention and the structural details thereof.

Figure 1:
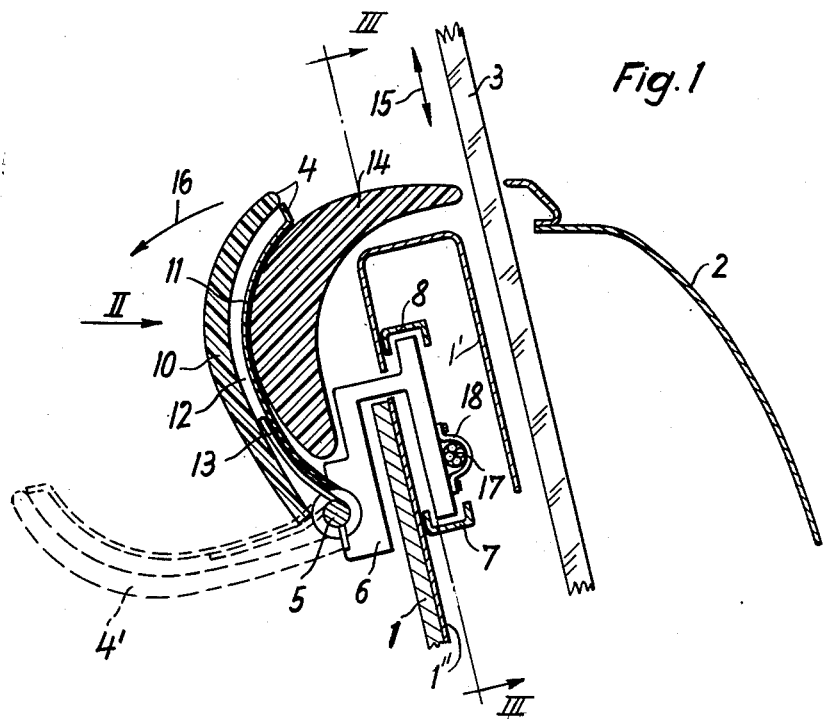
FIGURE 1 shows a vertical cross section of the new window control handle and the adjacent parts of a door of an automobile.

In FIGURE 1, the inner door casing of a car door is indicated by the numeral 1 and includes inner door parts 1′ and 1″, the outer metal sheathing of the door by 2, and the window pane by 3. The window control handle is indicated generally in its inoperative position by the numeral 4 and in its operative position, shown in dotted lines, by the numeral 4′. This control handle 4 is mounted on a hinge 5 so as to be pivotable about an angle of approximately 90°, and hinge 5 is secured to a substantially U-shaped bracket 6 which is slidable in a horizontal direction between a pair of rails 7 and 8 either directly or on rollers, not shown. Rail 7 is secured at the inner door part 1″ and rail 8 is secured to inner door part 1′. Hinge 5 is further provided with a coil spring 9 which tends to swing the control handle to its inoperative position 4 and to press it against a part of the inner door casing. The pressure between the handle and the inner door casing serves to prevent inadvertent movement of the handle and retains the window in any desired position. Handle 4 preferably has a curved shape as shown in FIGURE 1, and its outer part 10 consists of solid material, preferably a plastic, while its inner part 11 is spaced from the outer part so as to form a cavity 12 into which one free arm 13 of coil spring 9 is inserted. The curvature of handle 4 is made in accordance with the shape of the outer surface of a covering member 14 which is preferably made of a plastic material and is bent at an angle of approximately 90° so as to cover the upper edge of the inner door casing 1.

Figure 2:
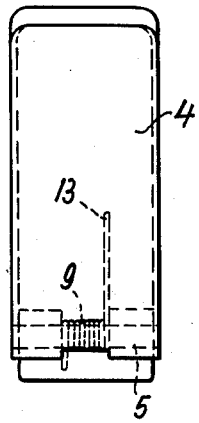
FIGURE 2 shows a plan view of the control handle alone as seen in the direction II in FIGURE 1.

FIGURE 2 only shows a plan view of the window control handle and indicates in dotted lines the arrangement of coil spring 9 on hinge pin 5 and of the free arm 13 of spring 9 within the cavity 12 in handle 4.

Figure 3:
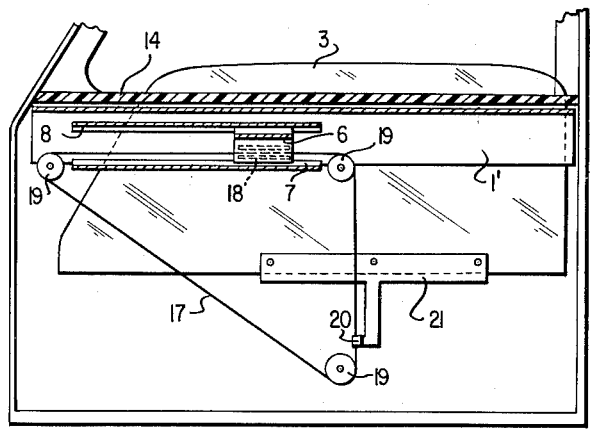
FIGURE 3 shows a sectional view taken substantially along the line III—III of FIGURE 1 illustrating the arrangement of the endless cable and the pulleys and guides means associated therewith.

The operation of the window control handle is as follows: If the window 3 is to be raised or lowered in the direction shown by the double-arrow 15, control handle 4 is first pivoted in the direction shown by arrow 16 to its lower position 4′ and then shifted in a horizontal direction, that is, in a direction vertical to the plane of FIGURE 1. Since handle 4 is mounted on bracket 6, it then slides the latter along rails 7 and 8 which are secured to the inner door casing 1, and this movement is transmitted to the horizontal part of an endless cable 17 which is secured to one arm of bracket 6 by a suitable clamp 18. The endless cable 17 and the associated structure is best illustrated in FIGURE 3. A vertical part of this cable which is movable on three pulleys 19, is connected to window 3 by means of a suitable slide member 20 connected to a window engaging lower support element 21, while the third, oblique part of the cable is connected to a long coil spring (not shown) which balances the weight of the window. Thus, if control handle 4 is shifted horizontally in one direction or the other, cable 17 is moved and its vertical part, slides the window 3 either upwardly or downwardly.

It will be clearly apparent from the drawings that control handle 4, when in its inoperative position, rests tightly on the covering member 14 of the door casing and protrudes to the inside of the car so little that a body portion of the driver or a passenger of the car moving against it will slide over it almost unnoticeably. This is an important advantage over the projecting handles of the usual window cranks which even in the normal use of a car are a cause of annoyance, especially to the driver, and which in the case of an accident are often the cause of bodily injury to the occupants of the car. On the other hand, the control handle is easily pivoted downwardly to the position 4' against the action of its spring 9 if the window is to be raised or lowered. Such movement of the window is very easily executed by a simple sliding action of the handle in a straight direction which may be carried out even with a finger since no more than the slight friction of the endless cable 17 over its pulleys and of the window pane in its guide slots has to be overcome, regardless of whether the window is being raised or lowered. As soon as the hand is removed from handle 4, the latter will snap back to its safe inoperative position.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. A control mechanism for raising and lowering a window of a motor vehicle comprising a handle normally maintained in inoperative position adjacent an inner wall surface of the vehicle, said handle having a configuration corresponding to the shape of said inner wall surface and having its upper end pointing away from the interior of said motor vehicle towards said window, a bracket, means for pivotably mounting said handle in a substantially vertical plane about a pivot axis adjacent its lower end on said bracket so as to be pivotable away from the plane of the inner wall surface of the vehicle into an operative position, means for guiding said bracket for movement in a substantially horizontal direction, and means for translating substantially horizontal movement of said handle and bracket into a substantially vertical movement of said window.

2. A control element for raising and lowering a window of a motor vehicle by means of an endless cable having a substantially vertical portion operatively connected to said window, comprising a handle normally maintained in an inoperative position adjacent an inner wall surface of the vehicle, said handle including an inner and an outer part secured to each other, said outer part of said handle consisting of a plastic material and said inner part being of sheet metal, a covering member secured to said inner wall surface and having a cross-sectional shape curving at a substantially right angle toward the plane of said window and covering the upper edge portions of said inner wall surface, said inner part of said handle having a curvature substantially corresponding to the curvature of the outer surface of said covering member and adapted to engage therewith in the inoperative position of said handle, a bracket, means for pivotably mounting said handle at one end thereof on said bracket so as to be pivotable about a substantially right angle relative to the plane of the inner wall surface of the vehicle into an operative position, means for guiding said bracket so as to be movable in a substantially straight direction, means for securing said bracket to said endless cable for transmitting a movement of said handle and bracket to said cable substantially in the axial direction of said pivoting means and through said cable to said window for raising and lowering the same, and returning and retaining means for returning said handle from the operative position to the inoperative position when the desired window position is reached and for retaining the window in the desired position, said returning and retaining means comprising a coil spring mounted on said means for pivotably mounting said handle and having a free arm portion engaging within a recess provided in said handle.

3. A control mechanism for raising and lowering a window of a motor vehicle comprising a handle normally maintained in an inoperative position pressed against an inner wall surface of the vehicle, said handle having a configuration corresponding to the shape of said inner wall surface, a bracket, means for pivotably mounting said handle on said bracket about a pivot axis adjacent the lower end of said handle so as to be pivotable in a substantially vertical plane away from the plane of the inner wall surface of the vehicle into an operative position, means for guiding said bracket for movement in a substantially horizontal path, means for translating substantially horizontal movement of said handle and bracket into a substantially vertical movement of said window, and spring means secured to said handle and effective anywhere along the path of movement of said handle to normally press said handle into the inoperative position thereof against said inner wall surface of the vehicle.

References Cited in the file of this patent

UNITED STATES PATENTS

| | | |
|---|---|---|
| 455,652 | Bradshaw | July 7, 1891 |
| 2,164,150 | Brewster | June 27, 1939 |
| 2,201,444 | Marsh | May 21, 1940 |

FOREIGN PATENTS

| | | |
|---|---|---|
| 25,891 | Great Britain | of 1912 |
| 328,796 | Great Britain | May 18, 1930 |
| 570,156 | Great Britain | June 25, 1945 |
| 798,420 | Great Britain | July 23, 1958 |